US012656303B2

(12) United States Patent
Alvarez et al.

(10) Patent No.: US 12,656,303 B2
(45) Date of Patent: Jun. 16, 2026

(54) REAGENTLESS DISSOLUTION AND QUANTIFICATION OF PARTICULATE ANALYTE IN A SAMPLE VIA MEMBRANE ELECTROLYSIS

(71) Applicant: University of Cincinnati, Cincinnati, OH (US)

(72) Inventors: Noe Alvarez, Cincinnati, OH (US); Artur Huseinov, Cincinnati, OH (US); William R. Heineman, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 167 days.

(21) Appl. No.: 18/496,143

(22) Filed: Oct. 27, 2023

(65) Prior Publication Data

US 2024/0142401 A1 May 2, 2024

Related U.S. Application Data

(60) Provisional application No. 63/419,873, filed on Oct. 27, 2022.

(51) Int. Cl.
*G01N 27/413* (2006.01)
*G01N 27/30* (2006.01)
(Continued)

(52) U.S. Cl.
CPC ......... *G01N 27/413* (2013.01); *G01N 27/308* (2013.01); *G01N 27/36* (2013.01); *G01N 27/40* (2013.01)

(58) Field of Classification Search
CPC .... G01N 27/413; G01N 27/308; G01N 27/36; G01N 27/40; G01N 27/42; G01N 33/1813
See application file for complete search history.

(56) References Cited

U.S. PATENT DOCUMENTS

| | | | |
|---|---|---|---|
| 2013/0146473 A1 | 6/2013 | Lambert et al. | |
| 2021/0206668 A1* | 7/2021 | Blunn | B01D 61/44 |
| 2024/0309531 A1* | 9/2024 | Tyagi | C25B 9/63 |

FOREIGN PATENT DOCUMENTS

| | | |
|---|---|---|
| AU | 2008331796 B2 | 6/2009 |
| CN | 109179592 A | 1/2019 |
| KR | 20140044846 A | 4/2014 |

OTHER PUBLICATIONS

Huseinov et al., Near-electrode pH change for voltammetric detection of insoluble lead carbonate, Analytical Chimica Acta, 2021, 1186, 339087 (Year: 2021).*

(Continued)

*Primary Examiner* — Shizhi Qian
(74) *Attorney, Agent, or Firm* — DINSMORE & SHOHL LLP

(57) ABSTRACT

Described herein are methods and devices of detecting a particulate analyte in a sample solution, using an electrochemical cell having an anodic compartment and a cathodic compartment, wherein the anodic and cathodic compartments are separated by a semi-permeable membrane. The sample solution is acidified by applying a positive current to the anodic compartment and maintaining the positive current to permit anions to flow from the cathodic compartment to the anodic compartment through the semi-permeable membrane. The analyte is deposited on an electrode disposed in the anodic compartment by applying a negative current. The deposited analyte is stripped from the electrode and an electrochemical voltammogram is generated by measuring the current as the analyte is stripped from the electrodes. The voltammogram is used to determine the concentration of the analytes in the sample solution based on the generated electrochemical voltammogram.

13 Claims, 5 Drawing Sheets

(51) Int. Cl.
    *G01N 27/36*       (2006.01)
    *G01N 27/40*       (2006.01)

(56)              References Cited

OTHER PUBLICATIONS

Sanjuan et al., Paired electrolysis for simultaneous electrochemical water softening and production of weak acid solutions, Electrochemistry communications, 2019, 101, 88-92 (Year: 2019).*
Rau, Electrochemical Splitting of Calcium Carbonate to Increase Solution Alkalinity: Implications for Mitigation of Carbon Dioxide and Ocean Acidity, Environmental Science and Technology, 2008, 42, 8935-8940 (Year: 2008).*

\* cited by examiner

REAGENTLESS DISSOLUTION AND QUANTIFICATION OF PARTICULATE ANALYTE IN A SAMPLE VIA MEMBRANE ELECTROLYSIS

CROSS-REFERENCE TO RELATED APPLICATIONS

This application claims the benefit of U.S. Provisional Application No. 63/419,873 filed Oct. 27, 2022, the entire disclosure of which is incorporated herein by reference in its entirety.

STATEMENT REGARDING FEDERALLY SPONSORED RESEARCH

This invention was made with government support under Grant Number 2016484 awarded by the National Science Foundation. The government has certain rights in the invention.

TECHNICAL FIELD

The present disclosure relates generally to the field of particulate detection in a sample, specifically reagentless and autonomous detection of particulate matter.

BACKGROUND

Lead contamination in drinking water can be caused by various types of lead: lead ions, soluble lead complexes, and lead particulates. Before 1986, lead was used to produce pipes, fixtures, and welding materials for drinking water infrastructure. Under some conditions, such as elevated acidity or the presence of carbonates or polyphosphates, lead can leach from the pipes into tap water, causing tap water to be a potential source of lead poisoning. Orthophosphate is the most common inhibitor for preventing lead release into tap water. The inhibition occurs as a result of the formation of highly insoluble lead orthophosphate and derivative hydroxophosphates. However, these lead phosphate scales can aggregate over time, detach from the pipes and travel along with the water stream, causing severe contamination of tap water with particulate lead. Even in the absence of orthophosphate and other anions, lead precipitation still occurs through hydrolysis. At the average pH of tap water, up to 98% of lead is insoluble.

Traditional detection methods such as inductively coupled plasma mass spectroscopy (ICP-MS) and atomic absorption spectroscopy can detect all types of lead because of the associated sample preparation steps. Nevertheless, these methods are expensive, require trained personnel, and involve non-portable equipment. Further, because lead concentration in water is known to vary throughout the day, traditional methods are not suitable for continuous on-site analysis.

Electrochemical methods of lead detection have been utilized because these methods are simple, inexpensive, and have a high potential for on-site analysis. However, these methods are ineffective in detecting particulate forms of metal contaminants. Therefore, they cannot be employed as detection methods for particulates and colloidal solutions.

Voltammetric methods have also been employed in the detection of lead particulates. These methods are also simple, inexpensive, and show high potential for on-site analysis. Anodic stripping voltammetry is among the most widely used electrochemical techniques for lead detection, primarily due to its high sensitivity. This method is based on the deposition of lead on the electrode surface, referred to as the deposition step and its subsequent oxidation, referred to as the stripping step. Nevertheless, anodic stripping voltammetry is only suitable for soluble species. Unless the water sample is acidified, particulate lead species, including lead phosphates, will not be detected.

Accordingly, a need exists to develop comprehensive, efficient, and affordable devices, kits, and methods to test water for particulate metals, including lead.

SUMMARY

The present disclosure is directed to an electrochemical method for particulate sample, or colloidal solution preparation and detection of its components using electrochemical methods such as anodic stripping voltammetry.

Example embodiments disclosed herein are directed to methods of detecting a particulate analyte in a sample solution, the method comprising loading the sample solution into an anodic compartment of an electrochemical cell; loading an electrolyte solution into a cathodic compartment of the electrochemical cell, wherein the anodic and cathodic compartments are separated by a semi-permeable membrane; acidifying the sample solution by applying a positive current to the anodic compartment to provide oxonium cations, and maintaining the positive current to permit anions to flow from the cathodic compartment to the anodic compartment through the semi-permeable membrane, whereby the oxonium cations and the anions in the anodic compartment form an acid that dissolves the particulate analyte; depositing the analyte on an electrode disposed in the anodic compartment by applying a negative current to the anodic compartment; stripping the deposited analyte from the electrode by applying a potential to the electrode; generating an electrochemical voltammogram by measuring the current as the analyte is stripped from the electrodes; and determining the concentration of the analytes in the sample solution based on the generated electrochemical voltammogram.

In other embodiments, the present disclosure is directed to an electrochemical cell comprising an anodic compartment configured to hold a sample solution; a cathodic compartment, configured to hold an electrolyte solution, wherein the cathodic compartment is in fluid communication with the anodic compartment through a semi-permeable membrane; a first electrode system comprising: a first working electrode disposed in the anodic compartment; and a second electrode system disposed in the anodic compartment, the second electrode system comprising: a second working electrode.

In another embodiment, the present disclosure is directed to a method of detecting lead in tap water solution, the method comprising placing the tap water and potassium nitrate in an electrochemical cell, the electrochemical cell comprising: an anodic compartment configured to hold the tap water, a cathodic compartment, configured to hold the potassium nitrate, wherein the cathodic compartment is in fluid communication with the anodic compartment through an anion exchange membrane; a first electrode system comprising: a platinum mesh working electrode disposed in the anodic compartment, a first wire counter electrode disposed in the cathodic compartment; a second electrode system disposed in the anodic compartment, the second electrode system comprising: a glassy carbon working electrode, a second counter electrode, and a potentiostat communicatively coupled to the glassy carbon working electrode and configured to generate a current therein; acidifying the tap water in the anodic chamber comprising: generating a positive current in the platinum mesh electrode, wherein the positive current generates oxonium cations in the anodic compartment; maintaining the positive current on the platinum mesh electrode, thereby allowing nitrate to flow from the cathodic compartment into the anodic compartment through the anion exchange membrane; forming nitric acid in the anodic compartment, thereby lowering the pH of the tap water and dissolving the lead; applying a negative current to the glassy carbon electrode, thereby depositing lead on the glassy carbon electrode; stripping the deposited lead from the glassy carbon electrode by applying a square wave potential pulse to the glassy carbon electrode, wherein the square wave potential pulse comprises rapidly alternating the potential between a base potential and a peak potential; and measuring the current response at the glassy carbon electrode as a function of the applied potential to generate an electrochemical voltammogram to determine the concentration of the lead in the tap water.

These and other features, aspects, and advantages will become better understood with reference to the following description and the appended claims.

Additional features and advantages of the embodiments described herein will be set forth in the detailed description that follows, and in part will be readily apparent to those skilled in the art from that description or recognized by practicing the embodiments described herein, including the detailed description that follows, the claims, as well as the appended drawings.

BRIEF DESCRIPTION OF THE DRAWINGS

The following detailed description of specific embodiments of the present disclosure can be best understood when read in conjunction with the following drawings.

DETAILED DESCRIPTION

Figure 1A:
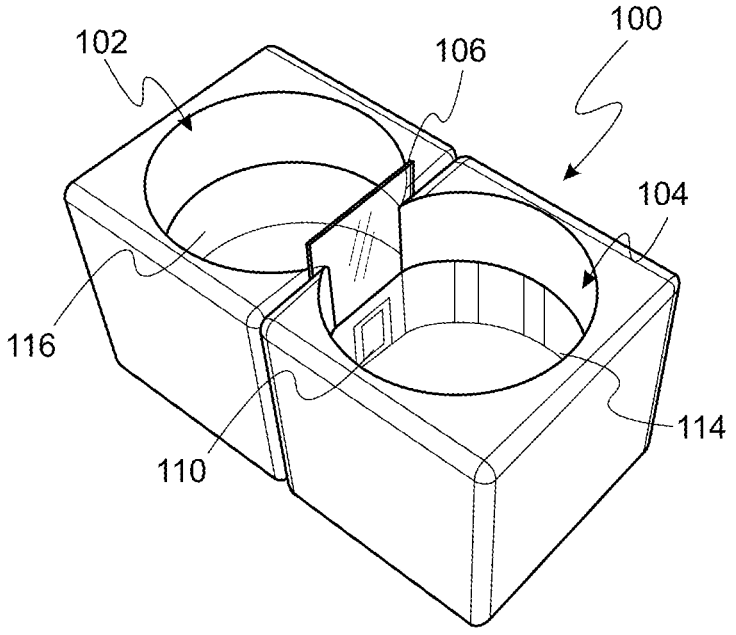
FIG. 1A schematically illustrates an electrochemical cell according to one or more embodiments described herein.

The details of one or more embodiments of the presently-disclosed subject matter are set forth in this document. Modifications to embodiments described in this document, and other embodiments, will be evident to those of ordinary skill in the art after a study of the information provided in this document.

While the following terms are believed to be well understood by one of ordinary skill in the art, definitions are set forth to facilitate explanation of the presently-disclosed subject matter.

Unless defined otherwise, all technical and scientific terms used herein have the same meaning as commonly understood by one of ordinary skill in the art to which the presently-disclosed subject matter belongs.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "sample solution" refers to a representative sample that is suspected of containing an analyte of interest. A sample solution can be any fluid suspected of containing the analyte of interest. In some embodiments, a sample, such as paint chips or soil, suspected of containing the analyte of interest, can be dissolved in or mixed with a fluid, such that the analyte of interest can be detected. Optionally, a sample solution includes an environmental sample. Optionally, the sample solution is water, such as tap water. In other embodiments, the sample is a biological sample, such as blood, saliva, bone, urine, tissue, hair, skin, sputum, and the like. As an example, and without being bound by theory, the embodiments described herein use tap water as the sample solution. The analyte of interest may be any species that is suitable for an acidic or basic preparation, such as metals. Generally, any electroactive metal can be quantified using the devices and methods described herein. In some embodiments, the analyte of interest is lead. In other embodiments, the analyte of interest is another heavy metal.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

As noted above, the presence of particulate lead in tap water has been a limiting factor in the design of accurate and portable platforms for quantifying this toxic metal. Convenient and affordable electrochemical techniques are blind to particulate species and thus require additional chemical processing such as sample acidification. The present disclosure describes the fundamentals and the use of membrane electrolysis for the reagentless sample preparation of tap water samples for the detection of particulate lead. Membrane electrolysis allows for the in-situ generation of nitric acid, which, in combination with anodic stripping voltammetry, provides a powerful tool for the accurate and reagent-free detection of lead. The configuration of the setup allows for its autonomous operation and requires minimal attention, making this method accessible to the general public.

Specifically, the present disclosure describes methods of quantifying insoluble species directly in solution without prior chemical treatment. It will be appreciated that, while lead is used as an illustrative example, the detection of other insoluble metals is within the scope of the disclosure. Additionally, in order to obtain a more comprehensive analysis, including quantitative data for multiple species, dissolution of the species is achieved using membrane electrolysis.

Besides lead particulates in drinking water, the increased use of nanoparticles in industrial products and their subsequent release into water streams and ingestion by humans has posed similar concerns related to toxicity. The presently disclosed methods can be modified and adapted to detect silver nanoparticles (AgNP), which have also caused concern. The easy detection of AgNPs and other nanoparticles in water and biological tissue is critical for understanding more about the toxicity and health effects of nanoparticles. The methods and systems can be readily adapted to quantify any electroactive metal. Optionally, the methods and systems described herein are adapted to quantify metals other than alkali metals, alkali earth metals and lanthanides. In some embodiments, the methods are adapted to quantify Fe, Mg, Si, Mn, and/or Na.

Figure 1B:
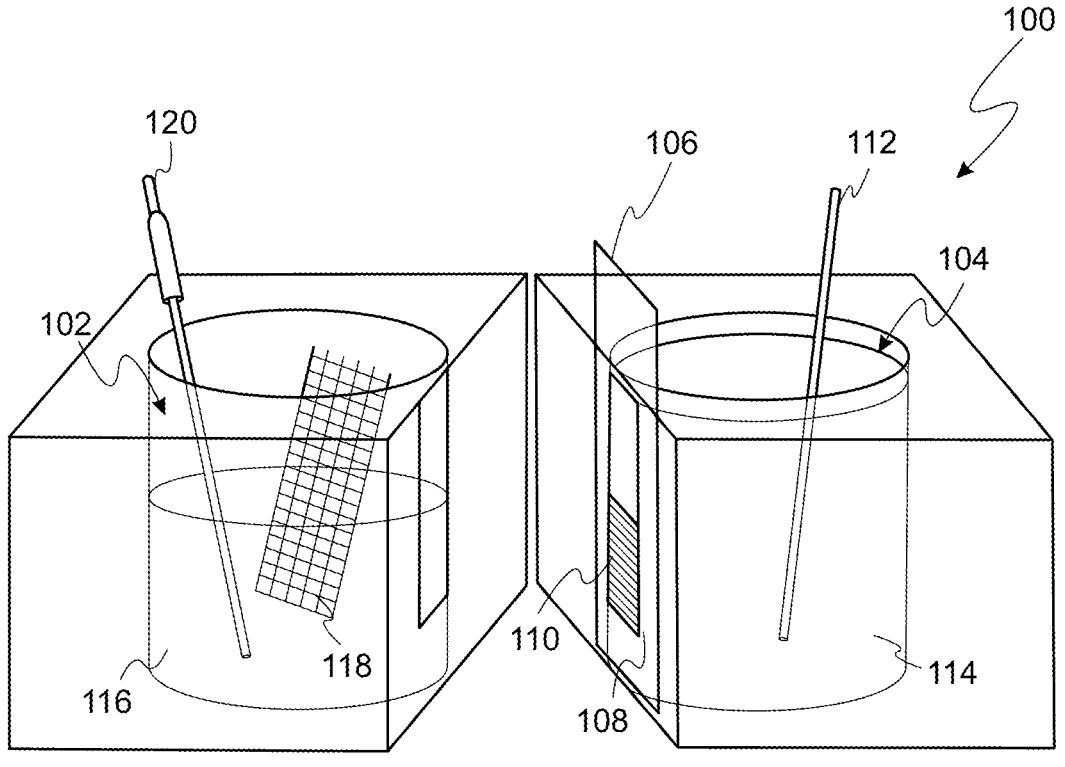
FIG. 1B schematically illustrates an alternative view of the embodiment of FIG. 1A.

Embodiments described herein generally include an electrochemical unit for the autonomous and reagentless detection of lead in a sample. In some embodiments, lead detection occurs directly in the electrochemical unit. One illustrative embodiment of an electrochemical unit 100 is depicted in FIGS. 1A-1B. In some embodiments, the electrochemical unit 100 is a membrane-assisted electrochemical cell. Generally, the electrochemical unit 100 includes a plurality of compartments, such as two, three, four, five, six, etc. Generally, each compartment is configured to hold a fluid, such as a sample solution and/or an electrolyte solution, described in greater detail herein. In some embodiments, such as depicted in FIGS. 1A-1B, the electrochemical unit 100 includes two compartments. Generally, the electrochemical unit 100 includes at least one anodic compartment 102 and at least one cathodic compartment 104.

In some embodiments, the anodic compartment 102 is separated from the cathodic compartment by a divider 106. Optionally, the anodic compartment 102 is in fluid communication with the cathodic compartment 104, such as through an aperture 108. In some embodiments, a semi-permeable membrane 110 covers the aperture 108. In some embodiments, the semi-permeable membrane 110 is a selectively permeable membrane, such as a cation exchange membrane or an anion exchange membrane. In some embodiments, the semi-permeable membrane 110 is an anion exchange membrane. The use of an anion exchange membrane blocks the migration of protons, thereby allowing acidification to occur directly in the anodic compartment 102. This enables the detection of lead in the electrochemical cell 100 with as few as two compartments. Anion exchange membranes prevent lead from undergoing ion exchange and migration. Further, anion exchange membranes prevent carbonate precipitation.

A sample solution 116 is placed in the anodic compartment 102. The anodic compartment 102 is separated from the cathodic compartment 104 such that the pH in the anodic compartment 102 is significantly decreased through the oxidation of water to produce protons and/or oxonium cations. These cations then form of a strong acid in the anodic compartment 102, thereby converting insoluble lead in the sample to soluble lead ions. Additionally, the strong acid increases the conductivity in the anodic compartment

102. This electrochemical control of the pH and conductivity replaces conventional reagent-based sample preparation and provides consistent conditions for anodic stripping voltammetry detection.

Optionally, a working electrode 118 is placed in the anodic compartment 102. The working electrode 118 generally interacts with the species being oxidized and/or reduced. Exemplary working electrodes include, but are not limited to, mesh electrodes, glassy carbon electrodes, gold working electrodes, boron-doped diamond electrodes, copper electrodes, silver electrodes, and the like. In some embodiments, the working electrode 118 is a mesh electrode. Optionally, the mesh electrode is a platinum mesh electrode.

In some embodiments, the electrochemical unit 100 also includes a solid-state reference electrode 120. Exemplary, non-limiting examples of solid-state reference electrodes include silver/silver chloride (Ag/AgCl) electrodes, calomel (Hg/Hg$_2$Cl$_2$) electrodes, saturated silver sulfate (Ag/Ag$_2$SO$_4$) electrodes, silver/silver sulfide (Ag/Ag$_2$S) electrodes, ion-selective solid-state electrodes, and the like. In some embodiments, the solid-state reference electrode 120 is a silver/silver chloride (Ag/AgCl) electrode.

The cathodic compartment 104 is optionally filled with an electrolyte solution 114. The electrolyte solution 114 should be selected to generate a soluble compound with the particulate of interest. For example, and without being bound by theory, nitrate salts are suitable for use in detecting lead particulates, because lead nitrate is soluble. Illustrative electrolyte solutions include potassium nitrate, sodium nitrate, barium nitrate, magnesium nitrate, calcium nitrate, lithium nitrate, copper nitrate, and the like. In some embodiments, the electrolyte solution is potassium nitrate. The electrolyte solution may be present in any suitable concentration. Suitable concentrations include, but are not limited to, concentrations from about 0.1 M to about 20 M, including about 0.1 M 0.25 M, 0.5 M, 0.75 M, 1 M, 2 M, 3 M, 4 M, 5 M, 6 M, 7 M, 8 M, 9 M, 10 M, 11 M, 12 M, 13 M, 14 M, 15 M, 16 M, 17 M, 18 M, 19 M, and 20 M, and any range having endpoints defined by any two of the aforementioned values.

In some embodiments, a wire counter electrode 112 is placed in the cathodic compartment 108. Illustrative examples of suitable wire counter electrodes include platinum wire counter electrodes, graphite electrodes, glassy carbon electrodes, gold electrodes, stainless steel electrodes, titanium electrodes, and the like. In some embodiments, the wire counter electrode 112 is a platinum wire counter electrode.

Figure 3:
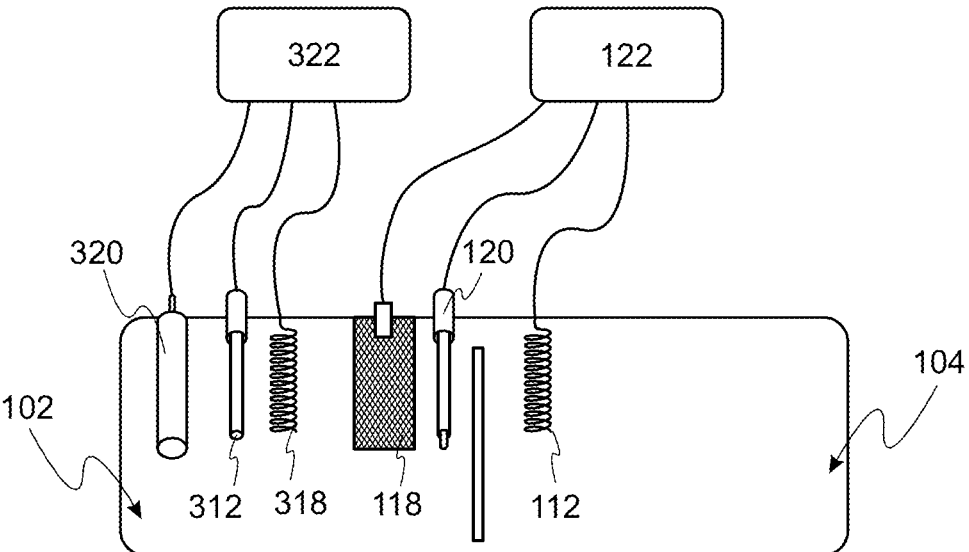
FIG. 3 schematically illustrates an electrochemical cell for electrolysis and anodic stripping voltammetry according to one or more embodiments described herein.

In some embodiments, the working electrode 118, the solid-state reference electrode 120, and the wire counter electrode 112 are communicatively coupled to a potentiostat 122, to control potential differences between the working electrode and the reference electrode, described in greater detail herein, and depicted for example, in FIG. 3.

Figure 2:
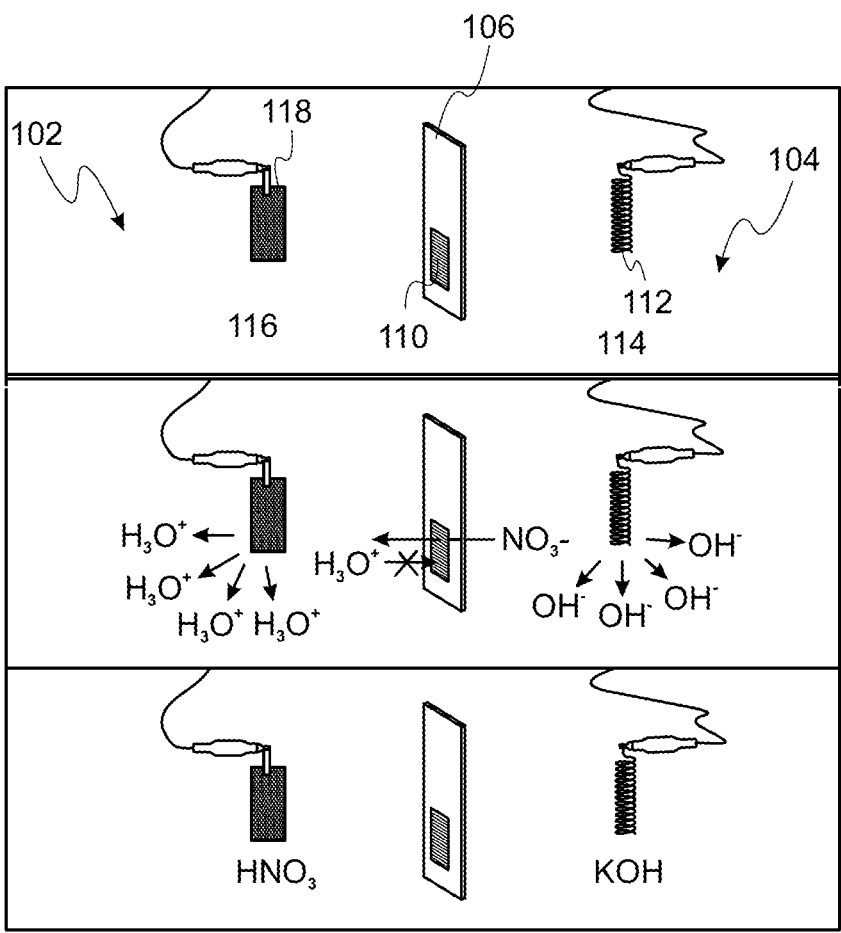
FIG. 2 schematically illustrates an electrolysis mechanism according to one or more embodiments described herein.

In some embodiments, to detect the presence of lead in a sample solution, the solution undergoes electrolysis, such as shown in FIG. 2. Electrolysis creates an acidic solution in the anodic compartment, thereby solubilizing lead particulates. After a sample solution 116 is placed in the anodic compartment 102, a controlled potential is applied to the working electrode 118 for an amount of time. Exemplary voltages include from about 1.0 V to about 10 V, including about 1.0 V, 1.5 V, 2.0 V, 2.5 V, 3.0 V, 3.5 V, 4.0 V, 4.5 V, 5.0 V, 5.5 V, 6.0 V, 6.5 V, 7.0 V. 7.5 V, 8.0 V, 8.5 V, 9.0 V, 9.5 V and 10 V, including any range having endpoints defined by any two of the aforementioned values. In some embodiments, the voltage is 4.5 V. Optionally, the amount of time is a predetermined amount of time. For example, the predetermined amount of time may be 15 minutes, 30 minutes, 45 minutes, 60 minutes, 75 minutes, 90 minutes, 120 minutes, etc. In other embodiments, the controlled potential is applied until a certain threshold, such as pH or conductivity is met.

Referring now to FIG. 2, a schematic mechanism of the electrolysis is shown. It is noted that the same components of the electrochemical cell, labeled in the top panel, are repeated in the diagram. As shown in FIG. 2, as the voltage potential is applied to the working electrode 118, water decomposition begins. A current is applied to the working electrode, generating $H_3O^+$. The wire counter electrode 112, serving as a cathode, allows for the generation of hydroxide. To maintain the charge balance between the anodic compartment 102 and the cathodic compartment 104, ion exchange through the semi-permeable membrane occurs. Because of the excess of anions from the electrolyte solution 114, those anions will dominate the ion exchange process. Optionally, a semi-permeable membrane 110 with low hydroxide conductivity, such as an anion exchange membrane is employed to further drive the anions into the anodic compartment. For illustrative purposes, and without being bound by theory, nitrate is used as an exemplary anion in the electrolyte solution 114. As the anions migrate into the anodic compartment, the $H_3O^+$ reacts with the ions to form, for example, nitric acid. In some embodiments, electrolysis is stopped when the pH of the anodic compartment reaches a target pH. Optionally, the target pH is about 1, about 2, about 3, or about 4, or any range having endpoints defined by any two of the aforementioned values. In some embodiments, the target pH is about 2.

The detection of lead at lower pH values has several advantages. First, some lead fractions that are insoluble at the pH of tap water (e.g., $Pb(OH)_2$, phosphates, carbonates) are soluble in more acidic solutions. Second, lower pH values are associated with higher conductivities, which lead to increased currents and thus enhance the sensitivity of the anodic stripping voltammetry detection.

Thus, this electrolysis step results in reagent-free acidification of the sample solution. Additionally, as described in greater detail herein, the generation of this strong acid uses a relatively small amount of the anions from the salt. Accordingly, this enables the electrochemical unit to be reused multiple times without replacing the electrolyte solution. The electrolysis creates a strong acid in the anodic compartment, thus converting the insoluble lead fraction into soluble $Pb^{2+}$ as well as decreasing the pH and increasing the conductivity to the desired levels. This electrochemical control of the pH and conductivity replaces conventional reagent-based sample preparation and provides consistent conditions for anodic stripping voltammetry detection. Optionally, the pH and conductivity of the sample solution are monitored throughout the electrolysis.

For electrochemical measurements, the wide range of conductivity in tap water (0.17 to 2.7 mS) may cause inaccurate results. Most tap water supplied to residential homes has an electrical conductivity in the range of 150-900 μS/cm, reflecting variations in ion content depending on the water source (e.g., river vs. groundwater), geographical location, and season. This diversity is a challenge for electrochemical analysis because insufficient conductivity can hinder accurate measurements of the current, which is the main parameter associated with the concentration of contaminants in a sample. This variation often leads to irreproducible anodic stripping voltammetry responses for different tap water samples. The conductivity control provided by the embodiments disclosed herein allows the conductivities of various tap water samples to be normalized, thereby facilitating accurate electrochemical measurements.

After the pH has reached the desired level, the lead particulate in the sample solution is quantified using anodic stripping voltammetry. Any suitable method or variation of anodic stripping voltammetry is contemplated and possible. Generally, during electrolysis, lead is oxidized and deposited on the first working electrode 118 as $PbO_2$. The $PbO_2$ formation process plays a vital role in the dissolution rate of lead particulates. Consuming any $Pb^{2+}$ from the solution (e.g., to form $PbO_2$ on the electrode surface) shifts the equilibrium, thus accelerating the dissolution.

For subsequent anodic stripping voltammetry detection, lead should be removed from the first working electrode 118 into the solution before undergoing voltammetry. Generally, to remove the lead, the potential applied to the first working electrode 118 is changed in a potential sweep, cycling from a negative to a positive voltage to reduce the $PbO_2$ to $Pb^{2+}$. The lead is thereby removed from the first working electrode 118 into the acidified sample solution.

For example, and without being bound by theory, to remove the lead from the working electrode the voltage may be cycled from −0.1 V and +0.1 V a set number of times. Other exemplary voltages to strip the lead from the electrode include −0.5 V, −0.4 V, −0.3 V, −0.2 V, −0.1 V, +0.1 V, +0.2 V, +0.3 V, +0.4 V, +0.5 V. Optionally, the voltage is cycled 500 times, 400 times, 300 times, 200 times, 100 times, 75 times, or 50 times. In some embodiments, the voltage may be cycled from −0.1 V and +0.1 V 100 times.

After the lead is cleaned from the first working electrode 118, the anodic stripping voltammetry process can begin. As shown in FIG. 3, in some embodiments, a second set of electrodes is placed in the anodic compartment 102 for use during the anodic stripping voltammetry. In some embodiments, the second set of electrodes is employed for the quantification of dissolved metal contaminants. Optionally, the second set of electrodes is communicatively coupled to a second potentiostat 322. In some embodiments, both the first set of electrodes and the second set of electrodes are communicatively coupled to a single potentiostat, which is configured to apply voltages to the appropriate electrodes for the time limits as necessary. In some embodiments, only the second set of electrodes is communicatively coupled to a potentiostat. In such embodiments, a voltage is applied to the working electrode 118 through other suitable means, such as batteries, variable resistors, pulse generators, and the like. In some embodiments, the second set of electrodes are inactive during electrolysis while the first set of electrodes are inactive during anodic stripping voltammetry.

Generally, the second set of electrodes includes a second working electrode 318, a second reference electrode 320, and a second wire counter electrode 312. Any suitable working electrode can be employed as the second working electrode 318. Exemplary working electrodes include, but are not limited to, glassy carbon electrodes, gold working electrodes, platinum mesh electrodes, boron-doped diamond electrodes, copper electrodes, silver electrodes, and the like. In some embodiments, the second working electrode 318 is a glassy carbon electrode.

In some embodiments, the second set of electrodes also includes a second solid-state reference electrode 320. Exemplary, non-limiting examples of solid-state reference electrodes include silver/silver chloride (Ag/AgCl) electrodes, calomel ($Hg/Hg_2Cl_2$) electrodes, saturated silver sulfate ($Ag/Ag_2SO_4$) electrodes, silver/silver sulfide ($Ag/Ag_2S$) electrodes, ion-selective solid-state electrodes, and the like.

In some embodiments, the second solid-state reference electrode 320 is a silver/silver chloride (Ag/AgCl) electrode.

In some embodiments, a second wire counter electrode 312 is placed in the anodic compartment 102. Illustrative examples of suitable wire counter electrodes include platinum wire counter electrodes, graphite electrodes, glassy carbon electrodes, gold electrodes, stainless steel electrodes, titanium electrodes, and the like. In some embodiments, the second wire counter electrode 312 is a platinum wire counter electrode.

To detect the amount of lead using anodic stripping voltammetry, a negative controlled potential is applied to the second working electrode 318 for a duration of time. This negative controlled potential accumulates the electroactive species on the electrode surface and is called the deposition phase. Exemplary controlled potential voltages include from about −0.1 V to about −10 V, including about −0.1 V, −0.2 V, −0.3 V, −0.4 V, −0.5 V, −0.6 V, −0.7 V, −0.8 V, −0.9 V, −1.0 V, −1.5 V, −2.0 V, −2.5 V, −3.0 V, −3.5 V, −4.0 V, −4.5 V, −5.0 V, −5.5 V, −6.0 V, −6.5 V, −7.0 V, −7.5 V, −8.0 V, −8.5 V, −9.0 V, −9.5 V and −10 V, including any range having endpoints defined by any two of the aforementioned values. In some embodiments, the voltage is −1.5 V.

In some embodiments, the duration of time of the deposition phase is from about 1 minute to about 10 minutes, including 1 minute, 2 minutes, 3 minutes, 4 minutes, 5 minutes, 6 minutes, 7 minutes, 8 minutes, 9 minutes, and 10 minutes, including any range having endpoints defined by any two of the aforementioned values. Optionally, the duration of time is about 3 minutes.

After the deposition phase, the electrochemical cells is allowed to equilibrate for a period of time, (i.e., the "quiescent period"). This phase ensures that the deposited lead reaches a steady-state concentration on the surface of the second working electrode. Optionally, the quiescent period has a duration of from about 10 seconds to about 60 seconds, including about 10 seconds, 15 seconds, 20 seconds, 25 seconds, 30 seconds, 35 seconds, 40 seconds, 45 seconds, 50 seconds, 55 seconds, and 60 seconds, including any range having endpoints defined by any two of the aforementioned values. Optionally, the quiescent period is about 30 seconds.

In some embodiments, the controlled potential is held at a constant voltage for the quiescent period. Generally, the controlled potential in the quiescent period is negative, but less negative than the voltage in the deposition phase. Optionally, the voltage during the quiescent period is from about −0.1 V to about −5.0 V, including about −0.1 V, −0.2 V, −0.3 V, −0.4 V, −0.5 V, −0.6 V, −0.7 V, −0.8 V, −0.9 V, −1.0 V, −1.5 V, −2.0 V, −2.5 V, −3.0 V, −3.5 V, −4.0 V, −4.5 V, and −5.0 V, including any range having endpoints defined by any two of the aforementioned values. In some embodiments, the voltage during the quiescent period is −1.0 V.

After the analyte is deposited on the second working electrode 318, the analyte is then oxidized back into the solution during a stripping phase. During the striping phase, as the potential increases, the accumulated analyte species undergo oxidation and are stripped from the electrode surface in the form of an oxidation peak. Generally, the stripping step is a linear, staircase, squarewave, or pulse potential. Optionally, the stripping step is square wave. In some embodiments, a square wave potential pulse is applied, wherein the potential is rapidly switched back and forth between a base potential and a peak potential. This square wave format enhances the sensitivity and allows for better differentiation of the stripping peak from background noise.

Optionally, the base potential is the same voltage as the deposition phase and/or the quiescent phase. In some embodiments, the base potential is from about −0.1 V to about −5.0 V, including about −0.1 V, −0.2 V, −0.3 V, −0.4 V, −0.5 V, −0.6 V, −0.7 V, −0.8 V, −0.9 V, −1.0 V, −1.5 V, −2.0 V, −2.5 V, −3.0 V, −3.5 V, −4.0 V, −4.5 V, and −5.0 V, including any range having endpoints defined by any two of the aforementioned values. In some embodiments, the base potential is about −1.0 V.

In some embodiments, the peak potential is from about 0.1 V to about 1.5 V, including about 0.1 V, 0.2 V, 0.3 V, 0.4 V, 0.5 V, 0.6 V, 0.7 V, 0.8 V, 0.9 V, 1.0 V, and 1.5 V, including any range having endpoints defined by any two of the aforementioned values. In some embodiments, the peak potential is about 0.7 V.

During the stripping phase, the current response at the second working electrode 318 is recorded by the second potentiostat 322 as a function of the applied potential to generate an electrochemical voltammogram. The current peak observed in the forward and reverse phases of the square wave is used for analysis. The recorded current response, particularly the difference between the forward and reverse peak currents, is analyzed to determine the concentration of the electroactive species in the solution. Calibration curves, described in greater detail herein may be used for quantification.

Other applications of the presently disclosed methods and devices include metal-based particulate contaminants, such as lead paint, and asbestos-based contaminants in dust and air. Asbestos is soluble in HCl and other acids, therefore the presently disclosed systems and methods could be modified to include a pump blowing through water in the anodic compartment, which would capture the asbestos particulates. The amount of metal ions can thereby be quantified to determine the amount of asbestos.

EXAMPLES

The following Examples are offered by way of illustration and are presented in a manner such that one skilled in the art should recognize are not meant to be limiting to the present disclosure as a whole or to the appended claims.

Materials and Methods:

Potassium nitrate ($KNO_3$), lead acetate, hydrochloric acid (HCl), nitric acid ($HNO_3$; ≥99.999% trace metals basis), and Cd, Hg, Cu, and Pb ICP-MS standards were purchased from Sigma-Aldrich. Fe, Sb, Ag, Be, U, Tl and Sn ICP-MS standards were purchased from High-Purity Standards. Al, Mn and As standards were obtained from Spex CertiPrep. Se and Cr ICP-MS standards were obtained from CPI International. Potassium orthophosphate, sulfuric acid ($H_2SO_4$), glacial acetic acid, and Zn ICP-MS standard were purchased from Fisher Scientific.

A Fumasep FAB-PK-130 anion exchange membrane (AEM) was used to separate the cathodic and anodic compartments. The original membrane was in the Br− form. For conversion to the NO3−form, the membrane was soaked in 1 M $KNO_3$ solution for 48 hours, as suggested by the manufacturer. When not in use, the membranes were stored in 1 M $KNO_3$. Before use, each membrane was tested for leaks. To separate the compartments of the electrochemical unit, a 5×21 mm hole was cut in a 75×45×0.254 mm vinyl slide, and the anion exchange membrane was attached to the slide with super glue (Loctite) to cover the hole.

The Ag/AgCl reference electrodes were obtained from eDAQ Incorporated. A glassy carbon (GC) electrode (3 mm diameter) from eDAQ Incorporated was used as the working electrode for voltammetric measurements, and a platinum mesh electrode (15×25 mm) was used as the working electrode for the membrane electrolysis. Platinum wires were used as counter electrodes (1.651-1.626 mm diameter). Palm Sens 3 and 4 potentiostats (Bioanalytical Systems, Inc.) were used for the membrane electrolysis and voltammetric measurements, respectively.

Simulated acidified tap water (SATW) was prepared by adding $HNO_3$ to Milli-Q water until the pH reached 2.0 (the conductivity of simulated acidified tap water was 5.0 mS/cm). Acidified tap water (ATW) was prepared by adding $HNO_3$ to tap water until the pH reached 2.0 (the conductivity of ATW was ≈5 mS/cm; slightly higher conductivity of ATW was caused by the presence of other salts in actual tap water. SATW and ATW were used as blanks throughout the experiments, unless otherwise stated.

Tap water was collected from the University of Cincinnati, Cincinnati, OH, USA. The pH of the analyzed tap water was in the range of 8.33-8.92 (average 8.67, mode 8.92) and the conductivity was in the range of 0.25-0.65 mS/cm (average 0.40, mode 0.29 mS/cm). The values provided are based on 50 measurements taken on different days within a 7-month period. The concentrations of other elements in the tap water were determined by ICP-MS. ICP-MS data were collected using an Agilent Technologies 7700 Series ICP-MS system.

Lead particulates were synthesized by mixing lead acetate and potassium orthophosphate solutions in the stoichiometric ratio. The precipitate was then vacuum-filtered and dried. The purity of the resulting solid was not critical because contamination with acetate or excess phosphate ions does not affect lead quantification. A working solution of $Pb(NO_3)_2$ (1.000 mg/L) was prepared by diluting a 1000±2 mg/L $Pb(NO_3)_2$ ICP-MS standard with Milli-Q water. An aqueous suspension of lead particulates (1.5 mg/L) was prepared by sonicating lead particulates in tap water. Each spike of lead particulates was added immediately after sonication.

Before use, the glassy carbon working electrode was polished consecutively with 0.30 μm and 0.05 μm alumina slurries. The counter electrode, electrochemical cell, and stirring bar were soaked in concentrated $HNO_3$ to remove all possible contaminants.

Anodic stripping square wave voltammograms (ASS-WVs) were processed using PSTrace 5.9 software. The peak area values were obtained by integrating the i-V traces between two specific potentials. ASSWVs were recorded in the range from −1.0 to +0.7 V using the following parameters: deposition potential, −1.5 V; deposition time, 180 seconds; quiet time, 20 seconds; potential step, 5 mV; amplitude, 50 mV; frequency, 30 Hz. All potentials were measured vs. Ag/AgCl. The solution was stirred with a stirring bar during the deposition step using a Fisher Scientific stirring plate at 700 rpm. Measurements were performed in a 25 mL Teflon beaker.

All quantitative measurements were performed in triplicate. The outliers were identified and removed using the Grubbs' test. The RSD, for the peak area of 48 nM lead (n=50) was 7%. The graphs of the regular residuals obtained for the lead in SATW, and lead in ATW calibrations exhibit no trends and show a random spread of data points, indicating good linearity. The quality of the calibration graphs was estimated using the standard deviation of the calibration ($V_{xo}$) and the calibration quality coefficient (CQC). In each case, these values did not exceed 5%. The limits of detection and limits of quantification were estimated at 3 s and 10 s, respectively.

Example 1: Electrochemical Unit

For the electrochemical unit, 25 mL of TW and 25 mL of 1 M $KNO_3$ were placed in the appropriate compartments of the MAEC cell. Each solution was stirred with a magnetic stirring bar at 700 rpm. The working and reference electrodes were placed in tap water (anodic compartment) and the counter electrode was placed in the $KNO_3$ solution (cathodic compartment). Electrolysis was performed at a constant potential of +4.5 V. A data acquisition unit, along with pH, conductivity, and temperature probes from MeasureNet Technologies Ltd. were used. For the continuous monitoring of pH and conductivity, the probes were placed in the anodic compartment.

Example 2: $NO_3^-$ Migration

To ensure that $NO_3^-$ migration does not occur spontaneously in the absence of an applied potential, Milli-Q water and 1 M $KNO_3$ were placed in the respective compartments and the conductivity of Milli-Q water sample was continuously recorded over time. The conductivity increased by ~2 μS/cm after 45 min. A similar trend was observed even in the absence of $KNO_3$ in the second compartment. This increase in conductivity could result from the absorption of $CO_2$ from the air, as also indicated by a slight decrease in the pH. However, the observed change is negligibly small (3% from the initial value) indicating that $NO_3^-$ ions do not migrate through the anion exchange membrane unless there is a charge imbalance. This experiment was subsequently used to test for leaks in the anion exchange membranes.

Example 3: Efficiency of Electrolysis

To calculate how much nitric acid was produced during one cycle of electrolysis, known amounts of $HNO_3$ were added to tap water until its pH was 2.0. To reach pH 2 in 25 mL of TW, 200 μmol of $HNO_3$ is needed. Thus, using 25 mL of 1 M $KNO_3$ solution allows for over 125 cycles of electrolysis. If saturated $KNO_3$ solution is used (35 g/100 mL), over 400 cycles may be completed. This number can be significantly larger when oversaturated solution is used. After adding each portion of $HNO_3$, the pH and conductivity were recorded. Thus, knowing how many protons are generated during electrolysis, it is possible to estimate the time needed to achieve a certain pH value. For example, it will take almost three additional hours to decrease the pH from 2 to 1.

Example 4: Electrolysis in the Absence of $KNO_3$

To demonstrate the necessity of $KNO_3$, the electrolysis was performed with tap water in both compartments. After 3 hours of electrolysis, the pH did not decrease below 3.1, and the conductivity increased by only 0.23 mS/cm.

The differences between the TW-TW and TW-$KNO_3$ systems are due to several factors. First, the conductivity of tap water is much lower than that of 1 M $KNO_3$, which decelerates the electrolysis process. Second, in the TW-TW case, the anions passing through the anion exchange membrane are mostly $HPO_4^{2-}$ and $CO_3^{2-}$. These anions form $H_2PO_4^-$ and $H_2CO_3$, respectively, which are much weaker acids than $HNO_3$. Finally, the anion concentration in tap water is much lower than 1 M. When the concentrations of $HPO_4^{2-}$ and $CO_3^{2-}$ in the cathodic compartment are too low, $OH^-$ begins to migrate through the anion exchange membrane into the anodic compartment to sustain electroneutrality, thus preventing further decrease in pH. Additionally, the limited dissociation of the formed weak acids results in much lower conductivity.

Example 5: Effects of pH and Conductivity on the ASV Response

A decrease in pH caused a significant increase in the lead peak area (data not shown). Initially, this change was insignificant, however, this increase occurred rapidly at lower pH levels. In contrast, the initial increase in conductivity leads to a drastic increase in the peak area, whereas this change becomes less prominent when the conductivity is very high. Thus, the gain in sensitivity mostly depends on the conductivity of tap water at higher pH values and on the pH itself when the pH is low. This demonstrates that the lead fractions are dissolving at lower pH levels.

Example 6: Lead Detection in SATW

The World Health Organization (WHO) and the US Environmental Protection Agency (EPA) have set maximum lead levels of 10 and 15 μg/L, respectively. To enhance the sensitivity, ASV was combined with a square wave mode. To minimize the possible interference from tap water components, all voltammetric parameters were studied in SATW which only contained Milli-Q water and $HNO_3$ (pH 2.0; conductivity 5.0 mS/cm). Lead stripping peaks were observed at −0.45 V and −0.35 V.

The peak at −0.45 V corresponds to stripping of Pb multilayers from one another (Pb/Pb), whereas the peak −0.35 V results from the stripping of monolayer Pb from the glassy carbon surface (Pb/GC). The peak at −0.35 V was also observed in the absence of lead in solution.

During the deposition step, $HNO_3$ is reduced to $NH_4^+$. $NH_4^+$ can then be oxidized during the stripping phase. However, the amount of $NH_4^+$ formed after applying the potential for only 3 minutes (the duration of deposition step) should be insignificant. Moreover, unlike metal ions, NH4+ does not accumulate on the electrode and thus should not yield such an intense peak.

To confirm that the background peak was not caused by the presence of $HNO_3$, ASSWVs were recorded in simulated water that contained acetic acid instead of $HNO_3$ (pH 2.0). In the absence of lead, the ASSWV is similar to that recorded in SATW, with a peak near −0.35 V. Substituting $HNO_3$ with $H_2SO_4$ or HCl gave similar results. The only other possible source of an oxidation reaction was the glassy carbon electrode. Thus, the background peak was assigned to the oxidation of functional groups on the glassy carbon surface. The calibration graph for lead analysis in SATW was linear in the range of 24.1-273 nM.

Example 7: Lead Detection in Electrolyzed Tap Water

The same ASSWV method was applied to the tap water acidified to pH 2.0 (ATW; conductivity ~5 mS/cm) produced by the electrolysis. The presence of copper in tap water significantly affects the mechanism of lead stripping from a glassy carbon electrode. A peak was observed near −0.45 V, representing Pb/Pb stripping, similar to that observed in SATW. An additional peak was observed around −0.35 V, representing lead stripping from the copper surface Pb/Cu), often referred to as Pb—Cu interaction, described in greater detail below. The Cu stripping peak is located at approximately −0.05 V. The calibration graph for lead analysis in ATW was linear in the range of 24.1-398 nM.

Example 8: Lead and Copper Deposits on Glassy Carbon Electrode

Unlike the ASSWV of SATW, that of electrolyzed tap water without any lead in the solution shows no oxidation peak at −0.35 V. The absence of this peak can be explained by the presence of copper in the solution. Because copper has a lower reduction potential than lead, copper deposits on the glassy carbon electrode more easily.

When recording the ASSWV after deposition, the glassy carbon electrode surface remains covered with copper until the potential reaches −0.05 V, thus preventing oxidation of the glassy carbon electrode. Consequently, oxidation at −0.35 V does not occur and does not interfere with lead detection. Pb/GC oxidation does not occur for the same reason.

When no lead is present in the solution, the surface of deposited copper can be easily oxidized. Small amounts of lead will partially cover the copper surface, thus hindering its oxidation and decreasing the peak. When the copper surface is completely covered with a monolayer of lead, copper oxidation is impossible, until the lead is stripped off.

Example 9: Calibration Curve Using SATW

Figure 4A:
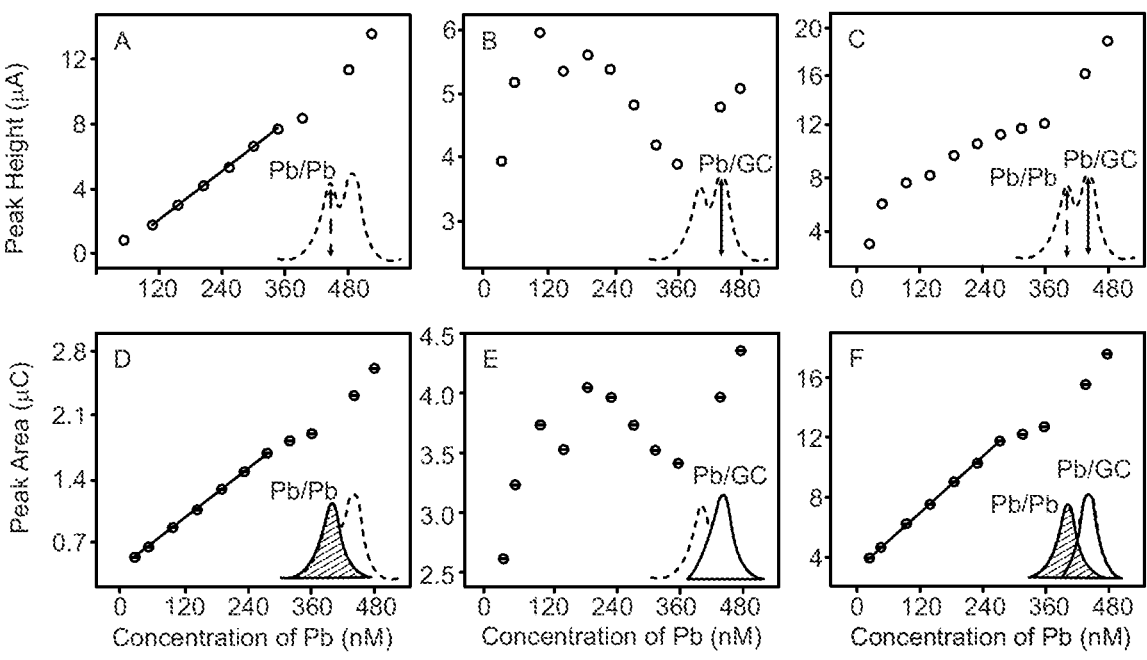
FIG. 4A depicts calibration curves for lead detection in SATW plotted for the peak heights and peak areas for Pb/Pb, Pb/GC, and Pb/Pb+Pb/GC.

The presence of multiple peaks makes it more difficult to build a quantitative relationship between the signal and lead concentration. To see how each of the peaks contributes to the analytical signal, the calibration graphs were plotted for the peak heights and peak areas of Pb/Pb, Pb/GC and their sum. These results are graphically depicted in FIG. 4A.

Figure 4B:
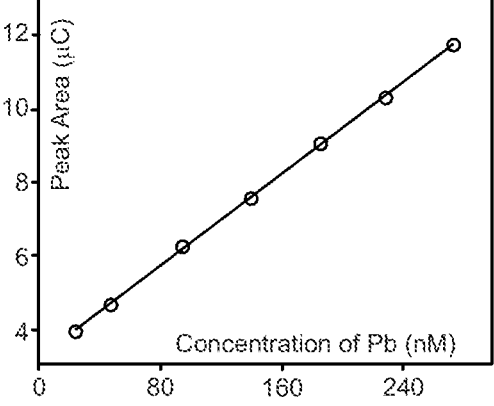
FIG. 4B depicts a calibration plot for quantitative detection of lead in SATW.

For the peak height, only Pb/Pb peak increased proportionally to the concentration of lead in the range of 94.6-273 nM. In case of the peak area, Pb/Pb and overall area of both Pb/Pb +Pb/GC were proportional to the lead concentration in the range of 24.1-273 nM. This range covers the target concentration of 48 nM and thus can provide accurate quantification. A total area of Pb/Pb+Pb/GC was used to construct the calibration plot for quantitative detection of lead in simulated acidified tap water, depicted in FIG. 4B.

Example 10: Calibration Curve Using Electrolyzed Tap Water

Figure 5A:
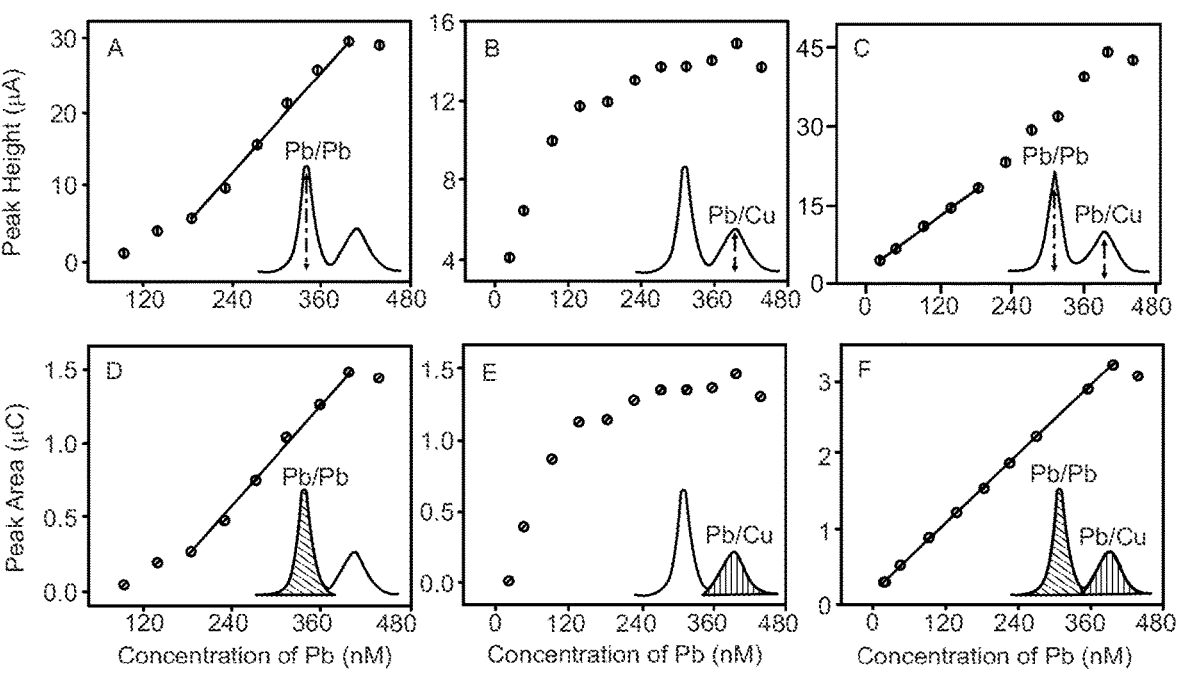
FIG. 5A depicts calibration curves for lead detection in electrolyzed tap water plotted for the peak heights and peak areas for Pb/Pb, Pb/Cu, and Pb/Pb+Pb/Cu.
Figure 5B:
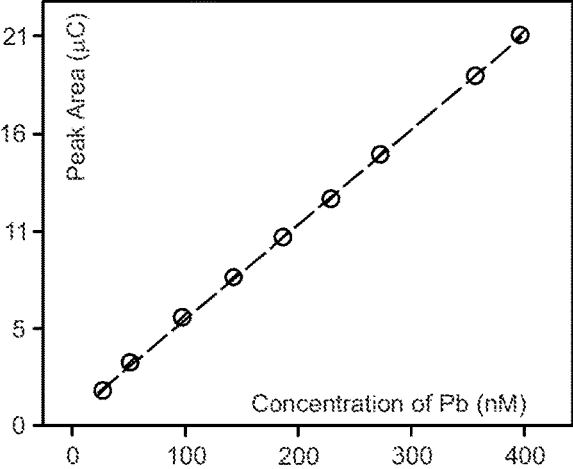
FIG. 5B depicts a calibration plot for the quantitative detection of lead in electrolyzed tap water.

To see how multiple peaks in electrolyzed tap water contribute to the lead stripping current, calibration graphs for Pb/Pb, Pb/Cu and their sum were constructed as depicted in FIG. 5A. The height of Pb/Cu peak is linearly proportional to Pb concentration only at lower concentrations, right before when Pb/Pb peak appears. The height of Pb/Pb peak is linearly proportional to Pb concentration in the range of 186-398 nM. The same trend is observed for the respective peak areas. The sum of Pb/Pb and Pb/Cu peak heights results in the calibration with the linear range of 24.1-186 nM. The broadest linear range of 24.1-398 nM was observed for the total peak area Pb/Pb+Pb/C, depicted in FIG. 5B.

Example 11: Reagentless Dissolution and Quantification of Lead Phosphate

The combination of electrolysis and ASV was used to dissolve and quantify highly insoluble lead phosphates. The solubility of lead phosphates depends on the pH (because $H_3PO_4$ is a weak acid) and the amount of phosphate in the solution. According to the US EPA, the concentration of phosphate in tap water ranges from 1.0 to 3.5 mg/L (10.5-36.8 mM), although certain service lines receive up to 4.19 mg/L (44.1 mM).

At the tested pH of 8.6 (tap water A), the solubility of lead phosphates ranges from 0.861 to 2.06 nM (0.535 to 1.28 μg of lead in 1 L, respectively). At pH 2.0, the theoretical solubility is drastically higher (70-169 g of lead in 1 L).

A tap water sample was intentionally spiked with lead phosphate suspension. Because the ASV results were cross-checked by ICP-MS, the actual amount of lead phosphate added did not play a vital role, as long as it was within the calibration range. The homogeneity and stability of the suspension were not important for the same reason. The sample was then subjected to electrolysis-ASV. The final pH was ≤2. Lead was quantified and the results are summarized in Table 1.

TABLE 1

| ASV (nM) | ICP-MS (nM) | Recovery (%) |
|---|---|---|
| 55.4 | 57.1 | 97 |
| 53.3 | 56.3 | 95 |
| 82.7 | 82.8 | 100 |
| 88.6 | 86.4 | 103 |
| 89.3 | 88.7 | 101 |
| 122.8 | 122.0 | 101 |
| 127.9 | 122.2 | 105 |
| 119.2 | 120.0 | 99 |
| 138.8 | 145.3 | 95 |
| 139.7 | 143.0 | 98 |
| 222.5 | 227.2 | 98 |
| 29.4 | 233.5 | 98 |
| 288.9 | 278.7 | 104 |

To experimentally confirm that the complete lead phosphate dissolution occurs at pH 2, 10 mg of solid lead phosphate was dispersed in 1 mL of tap water to form a cloudy suspension (this amount is ~5000 times larger than the maximum amount of LP tested with the ME-ASV). Then, 24 mL of SATW was added to adjust the pH to 2. The solution immediately became clear, with no visible solid particles.

Aspect Listing

In a first aspect, alone or in combination with any other aspect described herein, the present disclosure relates to a method of detecting a particulate analyte in a sample solution, the method comprising loading the sample solution into an anodic compartment of an electrochemical cell; loading an electrolyte solution into a cathodic compartment of the electrochemical cell, wherein the anodic and cathodic compartments are separated by a semi-permeable membrane; acidifying the sample solution by applying a positive current to the anodic compartment to provide oxonium cations, and maintaining the positive current to permit anions to flow from the cathodic compartment to the anodic compartment through the semi-permeable membrane, whereby the oxonium cations and the anions in the anodic compartment form an acid that dissolves the particulate analyte; depositing the analyte on an electrode disposed in the anodic compartment by applying a negative current to the anodic compartment; stripping the deposited analyte from the electrode by applying a potential to the electrode; generating an electrochemical voltammogram by measuring the current as the analyte is stripped from the electrodes; and determining the concentration of the analytes in the sample solution based on the generated electrochemical voltammogram.

In a second aspect, alone or in combination with any other aspect described herein, the present disclosure relates to a method wherein the positive current applied to the anodic compartment is about +4.5 V.

In a third aspect, alone or in combination with any other aspect described herein, the present disclosure relates to a method, wherein the positive current is applied to the anodic compartment for about 60 minutes.

In a fourth aspect, alone or in combination with any other aspect described herein, the present disclosure relates to a method wherein the positive current is applied to the anodic compartment with a first working electrode.

In a fifth aspect, alone or in combination with any other aspect described herein, the present disclosure relates to a method further comprising removing deposited analyte from the first working electrode prior to depositing the analyte on the electrode by cycling the voltage from about −0.1 V to about +0.1 V.

In a sixth aspect, alone or in combination with any other aspect described herein, the present disclosure relates to a method wherein the voltage is cycled 100 times.

In a seventh aspect, alone or in combination with any other aspect described herein, the present disclosure relates to a method wherein the negative current applied to the electrode is about −1.5 V.

In an eighth aspect, alone or in combination with any other aspect described herein, the present disclosure relates to a method wherein the negative current is applied to the electrode for about 3 minutes.

In a ninth aspect, alone or in combination with any other aspect described herein, the present disclosure relates to a method wherein stripping the deposited analyte from the electrode further comprises applying a square wave potential pulse to the electrode, wherein the square wave potential pulse comprises rapidly alternating the potential between a base potential and a peak potential.

In a tenth aspect, alone or in combination with any other aspect described herein, the present disclosure relates to a method wherein the base potential is about −1.0 V and the peak potential is about +0.7

In an eleventh aspect, alone or in combination with any other aspect described herein, the present disclosure relates to a method wherein the analyte is lead.

In a twelfth aspect, alone or in combination with any other aspect described herein, the present disclosure relates to a method wherein acidifying the sample solution comprises lowering the pH of the sample solution to about 2.

In a thirteenth aspect, alone or in combination with any other aspect described herein, the present disclosure relates to an electrochemical cell comprising an anodic compartment configured to hold a sample solution; a cathodic compartment, configured to hold an electrolyte solution, wherein the cathodic compartment is in fluid communication with the anodic compartment through a semi-permeable membrane; a first electrode system comprising: a first working electrode disposed in the anodic compartment; and a second electrode system disposed in the anodic compartment, the second electrode system comprising: a second working electrode.

In a fourteenth aspect, alone or in combination with any other aspect described herein, the present disclosure relates to an electrochemical cell wherein the sample solution is tap water.

In a fifteenth aspect, alone or in combination with any other aspect described herein, the present disclosure relates to an electrochemical cell wherein the electrolyte solution is potassium nitrate.

In a sixteenth aspect, alone or in combination with any other aspect described herein, the present disclosure relates to an electrochemical cell wherein the semi-permeable membrane is an anion exchange membrane.

In a seventeenth aspect, alone or in combination with any other aspect described herein, the present disclosure relates to an electrochemical cell wherein the first electrode system and/or the second electrode system is communicatively coupled to a potentiostat.

In an eighteenth aspect, alone or in combination with any other aspect described herein, the present disclosure relates to an electrochemical cell wherein the first working electrode is a platinum mesh electrode.

In a nineteenth aspect, alone or in combination with any other aspect described herein, the present disclosure relates to an electrochemical cell wherein the second working electrode is a glassy carbon electrode.

In a twentieth aspect, alone or in combination with any other aspect described herein, the present disclosure relates to a method of detecting lead in tap water solution, the method comprising placing the tap water and potassium nitrate in an electrochemical cell, the electrochemical cell comprising: an anodic compartment configured to hold the tap water, a cathodic compartment, configured to hold the potassium nitrate, wherein the cathodic compartment is in fluid communication with the anodic compartment through an anion exchange membrane; a first electrode system comprising: a platinum mesh working electrode disposed in the anodic compartment, a first wire counter electrode disposed in the cathodic compartment; a second electrode system disposed in the anodic compartment, the second electrode system comprising: a glassy carbon working electrode, a second counter electrode, and a potentiostat communicatively coupled to the glassy carbon working electrode and configured to generate a current therein; acidifying the tap water in the anodic chamber comprising: generating a positive current in the platinum mesh electrode, wherein the positive current generates oxonium cations in the anodic compartment; maintaining the positive current on the platinum mesh electrode, thereby allowing nitrate to flow from the cathodic compartment into the anodic compartment through the anion exchange membrane; forming nitric acid in the anodic compartment, thereby lowering the pH of the tap water and dissolving the lead; applying a negative current to the glassy carbon electrode, thereby depositing lead on the glassy carbon electrode; stripping the deposited lead from the glassy carbon electrode by applying a square wave potential pulse to the glassy carbon electrode, wherein the square wave potential pulse comprises rapidly alternating the potential between a base potential and a peak potential; and measuring the current response at the glassy carbon electrode as a function of the applied potential to generate an electrochemical voltammogram to determine the concentration of the lead in the tap water.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. The term "substantially" is used herein also to represent the degree by which a quantitative representation may vary from a stated reference without resulting in a change in the basic function of the subject matter at issue. Thus, it is used to represent the inherent degree of uncertainty that may be attributed to any quantitative comparison, value, measurement, or other representation, referring to an arrangement of elements or features that, while in theory would be expected to exhibit exact correspondence or behavior, may in practice embody something less than exact.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that where a first component is described as "comprising" or "including" a second component, it is contemplated that, in some embodiments, the first component "consists" or "consists essentially of" the second component. Additionally, the term "consisting essentially of" is used in this disclosure to refer to quantitative values that do not materially affect the basic and novel characteristic(s) of the disclosure.

It should be understood that any two quantitative values assigned to a property or measurement may constitute a range of that property or measurement, and all combinations of ranges formed from all stated quantitative values of a given property or measurement are contemplated in this disclosure.

While particular embodiments have been illustrated and described herein, it should be understood that various other changes and modifications may be made without departing from scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of detecting a particulate analyte in a sample solution, the method comprising
   loading the sample solution into an anodic compartment of an electrochemical cell;
   loading an electrolyte solution into a cathodic compartment of the electrochemical cell, wherein the anodic and cathodic compartments are separated by a semi-permeable membrane;
   acidifying the sample solution by applying a positive voltage to the anodic compartment to provide oxonium cations, and maintaining the positive voltage to permit anions to flow from the cathodic compartment to the anodic compartment through the semi-permeable membrane, whereby the oxonium cations and the anions in the anodic compartment form an acid that dissolves the particulate analyte;
   depositing the dissolved analyte on an electrode disposed in the anodic compartment by applying a negative voltage to the anodic compartment;
   stripping the deposited analyte from the electrode by applying a potential to the electrode;
   generating an electrochemical voltammogram by measuring a current as the deposited analyte is stripped from the electrode; and determining a concentration of the particulate analyte in the sample solution based on the generated electrochemical voltammogram.

2. The method of claim 1, wherein the positive voltage applied to the anodic compartment is about +4.5 V.

3. The method of claim 1, wherein the positive voltage is applied to the anodic compartment for about 60 minutes.

4. The method of claim 1, wherein the positive voltage is applied to the anodic compartment with a first working electrode.

5. The method of claim 4, further comprising removing deposited analyte from the first working electrode prior to depositing the particulate analyte on the electrode by applying a voltage and cycling the voltage from about −0.1 V to about +0.1 V.

6. The method of claim 5, wherein the voltage is cycled 100 times.

7. The method of claim 1, wherein the negative voltage applied to the electrode is about −1.5 V.

8. The method of claim 1, wherein the negative voltage is applied to the electrode for about 3 minutes.

9. The method of claim 1, wherein stripping the deposited analyte from the electrode further comprises applying a square wave potential pulse to the electrode, wherein the square wave potential pulse comprises alternating the potential between a base potential and a peak potential.

10. The method of claim 9, wherein the base potential is about −1.0 V and the peak potential is about +0.7 V.

11. The method of claim 1, wherein the particulate analyte is lead.

12. The method of claim 1, wherein acidifying the sample solution comprises lowering the pH of the sample solution to about 2.

13. A method of detecting lead in tap water solution, the method comprising placing the tap water and potassium nitrate in an electrochemical cell, the electrochemical cell comprising:

an anodic compartment configured to hold the tap water, a cathodic compartment, configured to hold the potassium nitrate, wherein the cathodic compartment is in fluid communication with the anodic compartment through an anion exchange membrane;

a first electrode system comprising:

a platinum mesh working electrode disposed in the anodic compartment, a first wire counter electrode disposed in the cathodic compartment;

a second electrode system disposed in the anodic compartment, the second electrode system comprising:

a glassy carbon working electrode, a second counter electrode, and a potentiostat communicatively coupled to the glassy carbon working electrode and configured to generate a current therein;

acidifying the tap water in the anodic chamber comprising:

generating a positive voltage in the platinum mesh electrode, wherein the positive voltage generates oxonium cations in the anodic compartment;

maintaining the positive voltage on the platinum mesh electrode, thereby allowing nitrate to flow from the cathodic compartment into the anodic compartment through the anion exchange membrane;

forming nitric acid in the anodic compartment, thereby lowering the pH of the tap water and dissolving the lead;

applying a negative voltage to the glassy carbon electrode, thereby depositing the dissolved lead on the glassy carbon electrode;

stripping the deposited lead from the glassy carbon electrode by applying a square wave potential pulse to the glassy carbon electrode, wherein the square wave potential pulse comprises alternating the potential between a base potential and a peak potential; and measuring a current response at the glassy carbon electrode as a function of the applied potential to generate an electrochemical voltammogram to determine the concentration of the lead in the tap water.

* * * * *